Figure 1:
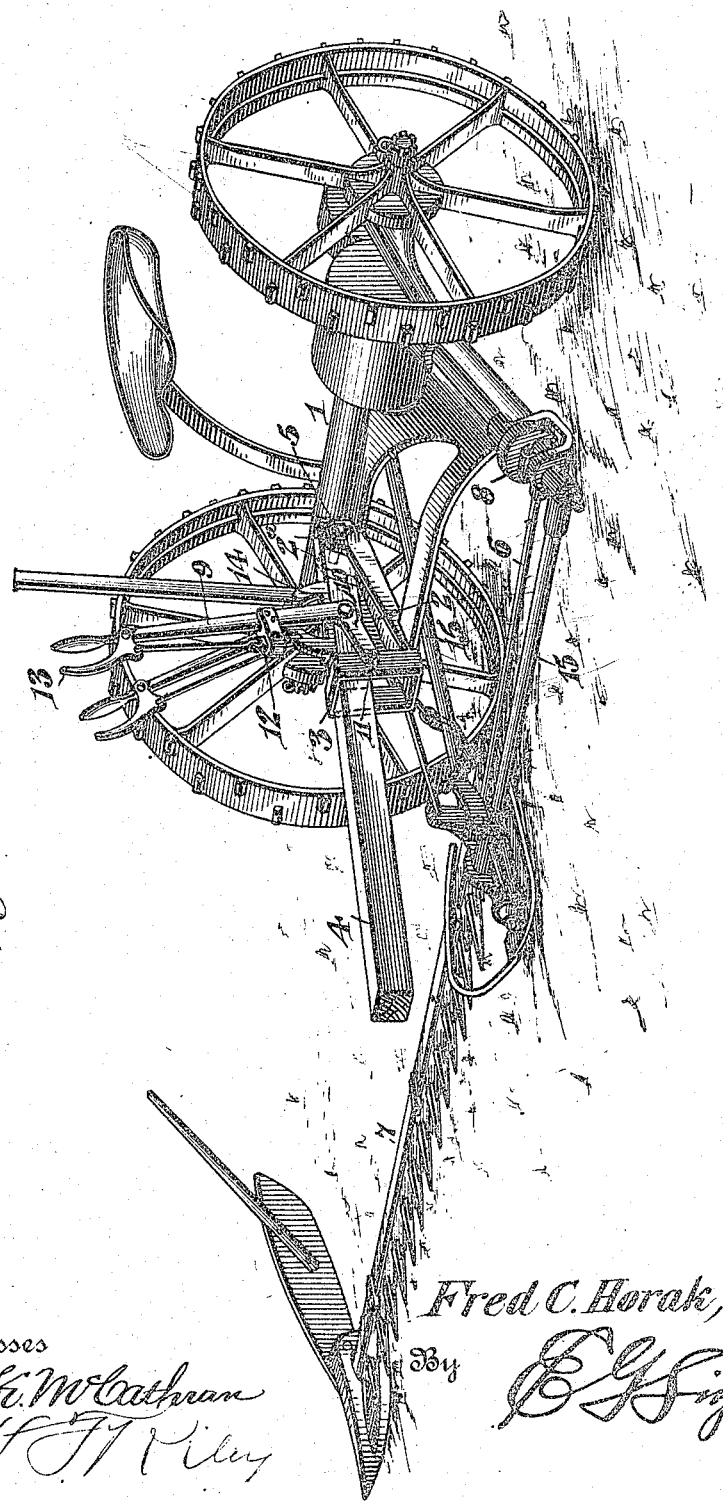

F. C. HORAK.
MOWER.
APPLICATION FILED MAR. 20, 1908.

899,490.

Patented Sept. 22, 1908.
2 SHEETS—SHEET 1.

Fred C. Horak, Inventor

Witnesses

By

Attorney

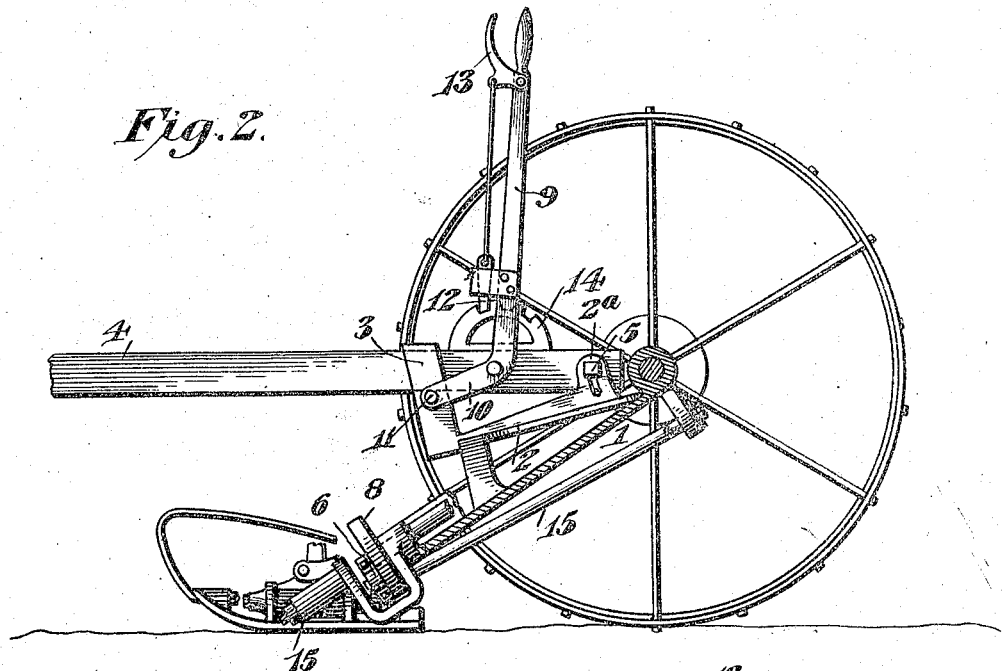
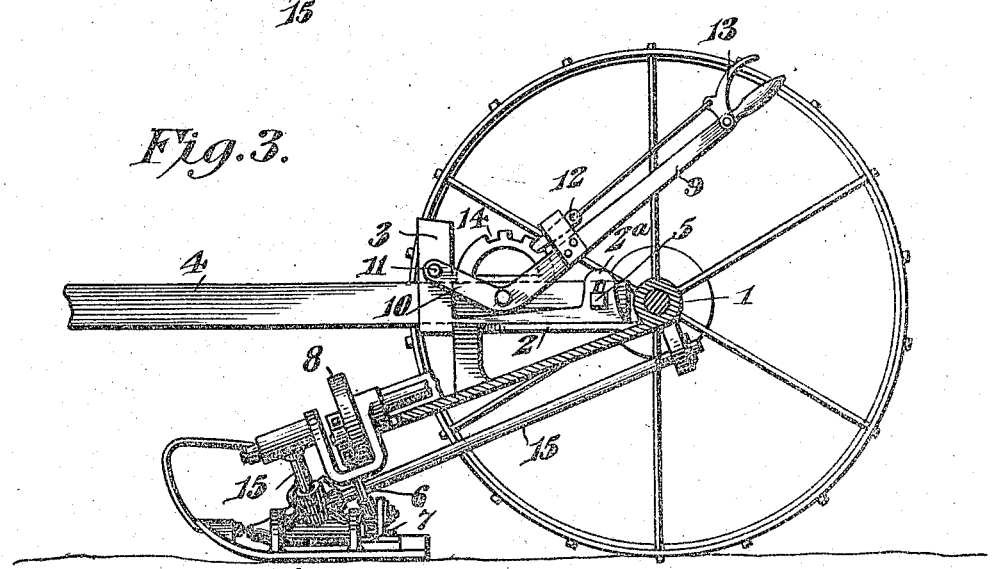

UNITED STATES PATENT OFFICE.

FRED C. HORAK, OF STUART, NEBRASKA.

MOWER.

No. 899,490.

Specification of Letters Patent.

Patented Sept. 22, 1908.

Continuation of application Serial No. 348,999, filed December 21, 1906. This application filed March 20, 1908. Serial No. 422,286.

*To all whom it may concern:*

Be it known that I, FRED C. HORAK, a citizen of the United States, residing at Stuart, in the county of Holt and State of Nebraska, have invented a new and useful Mower, of which the following is a specification.

The invention relates to improvements in mowers, and the present application is filed to take the place of a former application, Serial No. 348,999, filed by me on or about Dec. 21, 1906, for a similar device.

The object of the present invention is to improve the construction of mowers, and to provide means for dropping the front end of the mower frame, independently of the tongue, to a point close to the ground, so as to bring the pitman not only in line with but in substantially the same plane as the cutter bar to do away with the downward thrust or pressure and the consequent friction incident to the arrangement of the pitman at an inclination, whereby the mower is operated with greater effectiveness and with an expenditure of less power, while its durability is increased and the noise lessened.

With these and other objects in view, the invention consists in the construction, and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a mower, constructed in accordance with this invention, the front end of the mower frame being at the limit of its downward movement. Fig. 2 is a longitudinal sectional view of the same. Fig. 3 is a similar view, the yoke being raised to the limit of its upward movement.

Like numerals of reference designate corresponding parts in all the figures of the drawings.

In the accompanying illustration, the invention is embodied in a mower of the Deering type, but the improvements are equally applicable to various other forms of machines, such as the McCormick mower. The main frame 1 of the machine is constructed in substantially the same manner as the main frame of a Deering or McCormick mower with the exception that it is provided at the right hand side with an extension 2, formed by elongating the usual channeled tongue receiving seat, and provided at the front with an upwardly extending oblong yoke 3, composed of parallel sides and connecting top and bottom portions and having its lower portion formed by the sides and bottom of the extension 2 and receiving the tongue 4. The tongue 4 is secured at its rear end to the lugs or ears 2ª of the extension 2 at the rear end thereof by a transverse pivot 5, which permits the front portion of the main frame to be raised and lowered independently of the tongue.

In practice, the front end of the main frame of a McCormick or Deering mower is about eight inches above the ground, and the left hand or driving end of the pitman 6 is considerably higher than the sickle or cutter bar 7. This results in a downward thrust, which produces considerable friction and increases the power necessary to operate the cutting apparatus. The yoke enables the front end of the main frame, which carries the crank wheel 8, to be dropped close to the ground so that the pitman is lowered from an inclined position to substantially a horizontal position. By bringing the pitman not only in line with but in substantially the same plane as the sickle or cutter bar, the friction is greatly reduced, the cutting apparatus is rendered more effective, and the durability of the mower is increased. Also this change in the arrangement of the pitman causes the mower to operate with less noise than heretofore.

The main frame is raised and lowered by means of an operating lever 9, provided at its lower end with a short forwardly extending arm 10, arranged at substantially right angles to the body portion of the lever and secured by a pivot 11 to the side of the tongue at a point in rear of the yoke. The lever 9, which extends upward from the tongue, is connected with the inner side of the yoke at a point near the center thereof by means of the pivot 11, piercing the outer end of the arm 10 and the adjacent side of the yoke. The lever 9 is adapted to be oscillated backwardly and forwardly to raise and lower the yoke and the main frame of the mower, and it is locked in its adjustment by means of a dog or detent 12, connected with a latch lever 13 and arranged to engage a toothed segment 14, mounted on the tongue adjacent to the lever. The latch lever 13 is mounted on the operating lever 9 contiguous to the handle or grip portion thereof, and is adapted to be grasped simultaneously with the same in the usual manner. By adjusting the operating lever 9, the front end of the mower frame may be arranged close to the ground, and when the character of the surface of the ground renders it necessary, it may be raised to a greater or less degree to enable it to clear rough surfaces and other obstructions.

The main frame is mounted on the axle in the usual manner, and gearing of the ordinary construction is employed for operating the cutting apparatus, which is connected with the main frame by the usual forked coupling 15.

In practice the mower will be equipped with the usual operating lever for adjusting the cutting mechanism, and as these various parts of the mower are well known in the art and do not constitute a portion of the present invention, detail description and illustration thereof are deemed unnecessary.

Having thus fully described my invention, what I claim as new and desire to secure by Letters Patent, is:—

1. In a mower, the combination with an axle, of a main frame mounted on the axle and provided at the right hand side with a yoke, cutting mechanism, gearing for operating the cutting mechanism including a crank wheel mounted on the front of the main frame at the left hand side thereof, and a pitman extending from the crank wheel to the cutter bar of the cutting apparatus, a tongue pivotally connected with the main frame and passing through the said yoke, and means for adjustably connecting the main frame and the tongue, whereby the front end of the main frame is lowered to arrange the pitman in the same horizontal plane as the cutting apparatus and is raised to clear obstructions.

2. In a mower, the combination with an axle, of a main frame mounted on the axle and provided at the right hand side with a yoke, cutting mechanism, gearing for operating the cutting mechanism including a crank wheel mounted on the front of the main frame at the left hand side thereof, and a pitman extending from the crank wheel to the cutter bar of the cutting apparatus, a tongue pivotally connected with the main frame and passing through the said yoke, adjusting means connected with the tongue and with the yoke and including an operating lever, a toothed segment, and a dog or detent carried by the lever for engaging the toothed segment.

3. In a mower, the combination with an axle, of a main frame mounted on the axle and provided at the right hand side with a yoke, cutting mechanism, gearing for operating the cutting mechanism including a crank wheel mounted on the front of the main frame at the left hand side thereof, and a pitman extending from the crank wheel to the cutter bar of the cutting apparatus, a tongue pivotally connected with the main frame and passing through the said yoke, an adjusting lever fulcrumed on the tongue and having a short arm connected to the yoke, and means for locking the lever in its adjustment.

In testimony, that I claim the foregoing as my own, I have hereto affixed my signature in the presence of two witnesses.

FRED C. HORAK.

Witnesses:
J. A. RICE,
FRED L. BARCLAY.